(No Model.)
J. E. PERL.
ANIMAL SPREADER.
No. 521,774. Patented June 19, 1894.
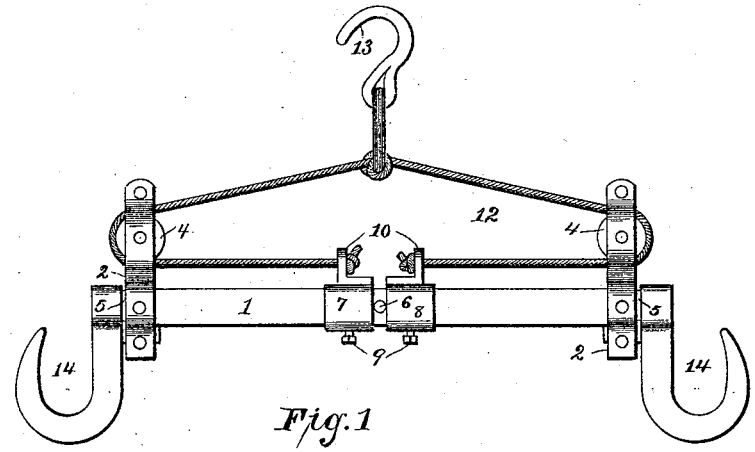
Fig. 1
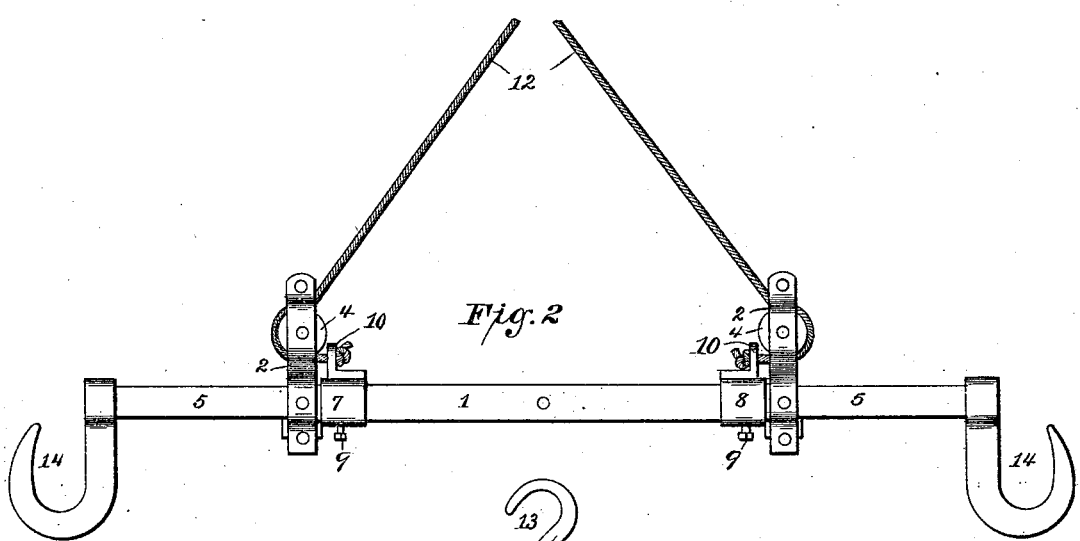
Fig. 2
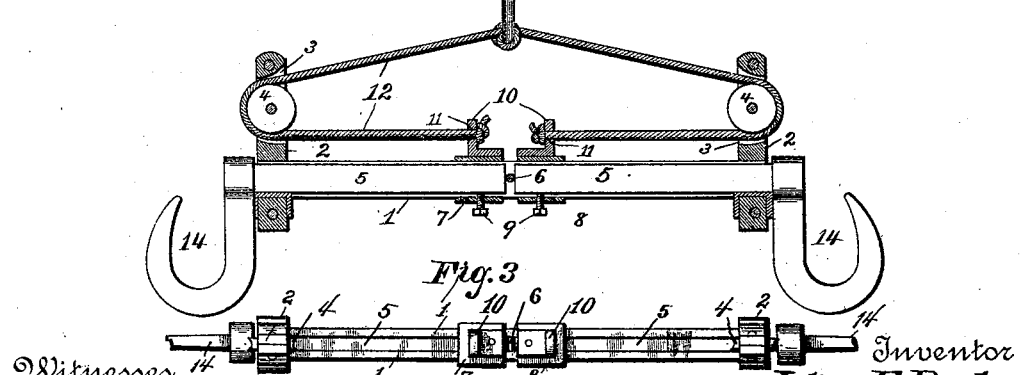
Fig. 3
Fig. 4
Witnesses
G. F. Myers
J. N. Withrow
Inventor
John E. Perl
By Joseph T. Kraus
Attorney

UNITED STATES PATENT OFFICE.

JOHN EVARISTE PERL, OF OSAGE MISSION, KANSAS.

ANIMAL-SPREADER.

SPECIFICATION forming part of Letters Patent No. 521,774, dated June 19, 1894.

Application filed December 19, 1893. Serial No. 494,072. (No model.)

*To all whom it may concern:*

Be it known that I, JOHN EVARISTE PERL, of Osage Mission, county of Neosho, State of Kansas, have invented certain new and useful Improvements in Animal-Spreaders, of which the following is a specification, reference being had to the accompanying drawings.

The object of my invention is to produce an improved device for spreading animals in butchering.

My invention consists in certain combination and arrangement of parts hereinafter specified in detail and succinctly set forth in the claims, whereby I produce an exceedingly simple and serviceable device for the purpose for which it is designed.

In the accompanying drawings: Figure 1 is a side elevation of my spreader in the contracted position. Fig. 2 is a similar view showing it in the expanded position. Fig. 3 is a longitudinal vertical section of my device. Fig. 4 is a plan view of the subject matter of Fig. 1.

Referring to the figures on the drawings: 1 indicates a frame which preferably consists of two strips of metal securely united by end pieces 2, in the upper part of each of which, in an aperture 3, is carried a pulley 4. The pieces which compose the sides of the frame are separated a small distance to receive sliding arms 5.

6 indicates a medial bolt or rivet which tends to prevent the sliding arms from passing the center and lends rigidity to the frame. The inner ends of the sliding arms are guided between the sides of the frame by collars 7, 8, secured, respectively, to the ends of the arms, as by a set screw 9. These collars are of such dimensions as to serve also to limit the outside movement of the sliding arms.

10 indicates studs secured, respectively, to the upper sides of the collars. Each is provided with an aperture 11. A rope 12 is passed around the pulleys and its opposite ends are passed through the apertures in the studs and knotted and prevent their withdrawal. In the middle of the rope a suspension hook 13 is securely fastened. When the suspension hook is securely in place the weight of the frame tends to force the sliding arms outwardly. Upon the outer end of each of the sliding arms is firmly secured an outwardly opening hook 14. These hooks, in practice, support the animal that is being suspended. When the weight of the animal is suspended from the hooks 14, the tendency of the sliding arms to move outwardly is increased, and by this means the quarters of the animal are spread as widely apart as possible, the force which tends to separate them being constant and tending to clear the parts as the carcass is split asunder.

I do not desire to limit myself to the details of construction herein shown and described, but reserve the right to modify and vary the same at will within the scope of my invention.

What I claim is—

1. In a spreader, the combination with a horizontal frame, of arms horizontally movable thereon, a rope secured at its opposite ends to the arms, and rope guiding mechanism whereby the weight of the frame is adapted to cause the arms to slide in opposite directions, substantially as set forth.

2. In a spreader, the combination with a horizontal frame consisting of separate side pieces and end pieces, of intermediate horizontally sliding arms provided with collars, pulleys in the end pieces, and a rope supported at a point between its ends above the frame, passing around the pulleys and secured at its opposite ends to the collars, substantially in the manner and for the purpose specified.

3. In a spreader, the combination with a horizontal frame, horizontally sliding arms thereon, a rope adapted to actuate the arms and support the frame, and mechanism adapted to limit the movement of the arms in either direction, substantially as specified.

4. The combination with a horizontal frame, of horizontally sliding arms thereon, collars adjustable upon the arms, and a rope secured at its opposite ends to the collars guided by the frame and supported at a point intermediate of its ends above the frame, substantially as set forth.

5. The combination with the frame 1, end pieces 2, pulleys 3, of the sliding arms 5 and 6 provided with outwardly opening hooks 14 and adjustable collars 7 and 8, a rope 12 secured at its opposite ends to the adjustable collars, passing around the pulleys 4, and provided with supporting mechanism at a point intermediate of its ends, substantially as specified.

In testimony of all which I have hereunto subscribed my name.

JOHN EVARISTE PERL.

Witnesses:
JOHN N. GEORGE,
J. J. STARKEY.